(12) United States Patent
Burkhardt et al.

(10) Patent No.: US 6,179,460 B1
(45) Date of Patent: Jan. 30, 2001

(54) TWIN SCREW EXTRUDER WITH SINGLE-FLIGHT KNEADING DISKS

(75) Inventors: Ulrich Burkhardt, Stuttgart; Gerhard Weihrich, Illingen, both of (DE)

(73) Assignee: Krupp Werner & Pfleiderer, GmbH (DE)

( * ) Notice: Under 35 U.S.C. 154(b), the term of this patent shall be extended for 0 days.

(21) Appl. No.: 09/468,737

(22) Filed: Dec. 21, 1999

(30) Foreign Application Priority Data

Dec. 24, 1998 (DE) .................................. 198 60 256

(51) Int. Cl.[7] ........................................ B29B 7/48
(52) U.S. Cl. ................................. 366/82; 366/85
(58) Field of Search ................... 366/79–85, 88–90, 366/301; 425/204, 208, 209

(56) References Cited

U.S. PATENT DOCUMENTS

| | | | |
|---|---|---|---|
| 3,122,356 | * | 2/1964 | Erdmenger . |
| 3,195,868 | * | 7/1965 | Loomans et al. . |
| 3,216,706 | * | 11/1965 | Loomans . |
| 3,387,826 | * | 6/1968 | Loomans . |
| 3,416,774 | * | 12/1968 | Fritsch . |
| 3,608,868 | * | 9/1971 | Koch . |
| 3,729,178 | * | 4/1973 | Stade . |
| 4,236,833 | * | 12/1980 | Blach ........................ 366/85 |
| 4,343,929 | * | 8/1982 | Sugio et al. ................ 366/83 |
| 4,534,652 | * | 8/1985 | Stade ......................... 366/85 |
| 4,556,324 | * | 12/1985 | Tynan ......................... 366/90 |
| 4,824,256 | * | 4/1989 | Haring et al. .............. 366/85 |
| 5,048,971 | * | 9/1991 | Wall et al. ................. 366/301 |
| 5,487,602 | * | 1/1996 | Valsamis et al. ........... 366/81 |
| 5,573,332 | * | 11/1996 | Weihrich et al. ........... 425/204 |

FOREIGN PATENT DOCUMENTS

| | | | |
|---|---|---|---|
| 3206325 | * | 9/1983 | (DE) ....................... 366/85 |
| 4338795 | * | 6/1995 | (DE) . |
| 422272 | * | 4/1991 | (EP) ....................... 366/82 |
| 6-143388 | * | 5/1994 | (JP) ....................... 366/82 |
| 1606171 | * | 11/1990 | (SU) ....................... 366/85 |

* cited by examiner

Primary Examiner—Charles E. Cooley
(74) Attorney, Agent, or Firm—Robert F. I. Conte; Lee, Mann, Smith, McWilliams, Sweeney and Ohlson

(57) ABSTRACT

A twin screw extruder has a casing with a working direction, two partially intersecting casing bores, which are parallel to each other, two shafts, which are disposed in the casing bores and which are drivable to rotate in the same direction of rotation about an axis of rotation, the axes of rotation having a distance A from each other, and single-flight kneading disks, which are fixed on the shafts and have surface lines extending parallel to the respective axis of rotation. The kneading disks, in a cross-section perpendicular to the axis of rotation, have a crest, which is formed as a segment of a circle about the respective axis of rotation and which has a crest angle b and a radius $R_A$, a bottom, which is formed as a segment of a circle about the respective axis of rotation and has a bottom angle g and a radius $R_I$ and two flanks, which join the crest and the bottom, $R_A > R_I$, $A \approx R_A + R_I$ and $0° \leq b \leq 45°$ applying.

17 Claims, 6 Drawing Sheets

TWIN SCREW EXTRUDER WITH SINGLE-FLIGHT KNEADING DISKS

BACKGROUND OF THE INVENTION

1. Field of the Invention

The invention relates to a twin screw extruder comprising a casing with a working direction; two partially intersecting casing bores, which are parallel to each other; two shafts, which are disposed in the casing bores and which are drivable to rotate in the same direction of rotation about an axis of rotation, the axes of rotation having a distance A from each other; and single-flight kneading disks, which are fixed on the shafts and have surface lines extending parallel to the respective axis of rotation, the kneading disks, in a cross-section perpendicular to the axis of rotation, comprising a crest, which is formed as a segment of a circle about the respective axis of rotation and which has a crest angle b and a radius $R_A$; a bottom, which is formed as a segment of a circle about the respective axis of rotation and has a bottom angle g and a radius $R_I$; two flanks, which join the crest and the bottom; $R_A > R_I$ und $A \approx R_A + R_I$ applying.

2. Background Art

Single-flight kneading disks are known from DE 813 154 B. They have a crest angle greater than 90°, in this regard possessing a comparatively important cross-sectional surface. The kneading disks wipe the casing as well as themselves. In these known kneading disk arrangements, no overall conveyance of the treated material takes place in or against the operating direction of an extruder which lodges the kneading disks. The mixing effect by this type of kneading disks is low. The same is true for the kneading effect. Furthermore, also the free cross-sectional surface is defined and thus the mean dwell time, within a lengthwise section of the extruder, of the material to be treated.

U.S. Pat. No. 5,573,332 teaches a screw element for a screw-type extrusion machine. The screw elements are helical and have varying pitch directions. Lengthwise mixing is obtained by the screwing in opposite directions, whereas crosswise mixing is attained by the elongated wedge of the flank arc. This crosswise flow is a typical continuous shear flow, which is primarily a dispersive mixing operation. Dividing the flow into various partial flows, recirculation and offset combination thereof do not take place, which is why the distributive mix is not optimal.

DE 43 38 795 C teaches a continuously working multi-screw extruding machine for masses to be plastified. Provided between two closely intermeshing conveying screws and a dam-up element is a screw which conveys forwards and adjacent thereto a non-intermeshing screw which conveys backwards. A drawback resides in that the wall of the casing cannot be scraped off, since the screws have a diameter that corresponds to half the center distance. This does not prevent the material to be treated from sticking on the casing wall. Since the casing wall is not wiped, this results in very bad heat transmission. In the case of high differences of temperature between the casing wall and the product, this will result in important inhomogeneities of temperature which will moreover negatively affect the material to be treated.

SUMMARY OF THE INVENTION

It is an object of the invention to improve a twin-screw extruder of the generic type such that given a minimal energy input and high dwell time, the entire material to be mixed is completely distributively mixed and simultaneously the casing wall is entirely wiped.

This object is attained by $0° \leq b \leq 45°$ applying to the crest angle b. The gist of the invention resides in providing cylindrical kneading disks—i.e. kneading disks having surface lines extending parallel to their respective axis—with a very small crest angle. This reduces the energy input and helps obtain mixing of the entire volume. Furthermore, complete scraping of the walls of the casing bores is ensured, i.e. there is no sticking, and good heat transmission is ensured. The wedge flows along the flanks of the kneading disks prevent neutral zones of reduced mixing to originate. The intermeshing action of the kneading disks ensures intense mixing of the material to be treated. The kneading disks wipe each other at least partially. Given a constant diameter of the casing bores, the free cross-sectional area available to the material to be treated is increased, as a result of which the throughput can be raised.

The extruder, in which the kneading disks of at least one shaft are offset in the working direction by an offset angle e in the direction of rotation for conveyance against the working direction, $0° > |e| > 180°$ applying, has the advantage of return conveying being attained, which strongly increases the dwell times.

The arrangement, according to which the kneading disks of one shaft are offset in the working direction against the direction of rotation by an offset angle $|e| > 180°$ and the kneading disks of the other shaft are offset in the working direction in the direction of rotation by an offset angle $|e| > 180°$, has the advantage that especially intense mixing is attained through a circulating way of conveyance.

Additional advantages and features of the invention will become apparent from the ensuing description of an exemplary embodiment, taken in conjunction with the drawing.

DESCRIPTION OF THE PREFERRED EMBODIMENT

Figure 1:
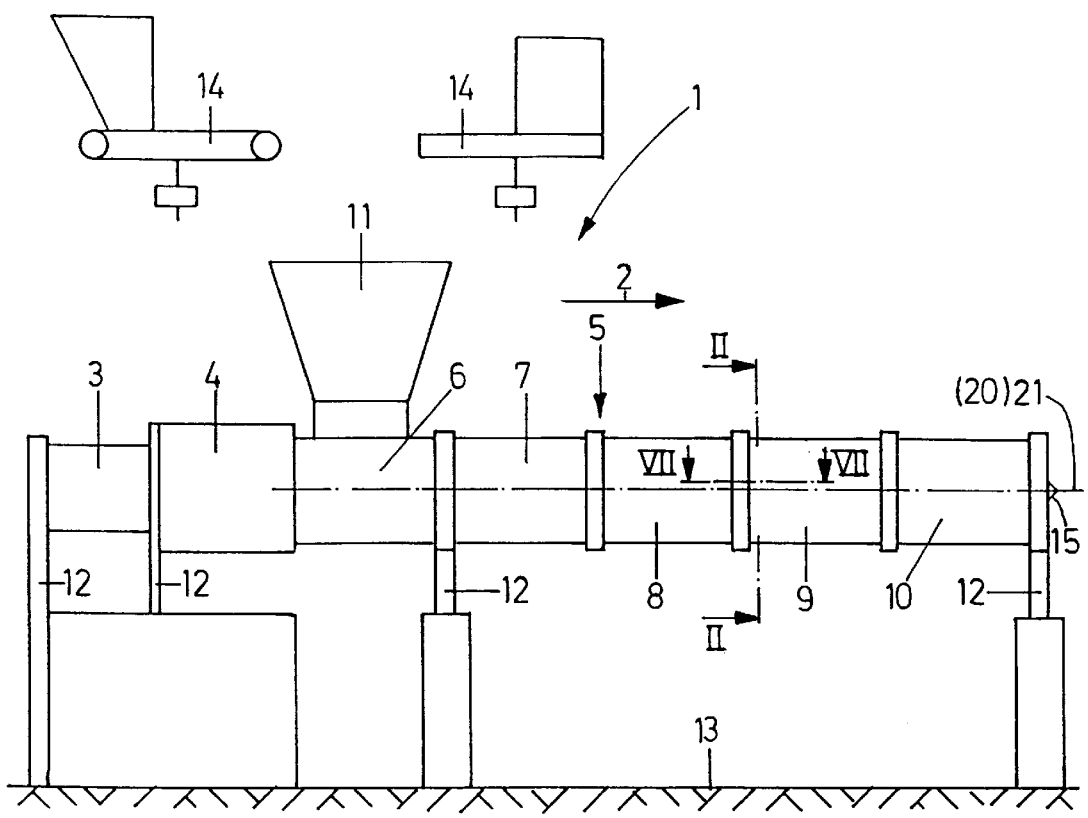
FIG. 1 is a diagrammatic illustration of a lateral longitudinal view of a twin screw extruder.

A twin screw extruder 1 comprises a driving motor 3, a gear 4 joined thereto on the input side, and a casing 5 joined thereto, all of them arranged one after the other in a working direction 2. The casing 5 consists of several casing sections 6, 7, 8, 9 and 10, which are disposed in the working direction 2 and joined to each other. Provided on the casing section 6 is an inlet hopper 11 for the supply of material to be treated. The aforementioned parts of the extruder 1 are supported by props 12 on a foundation 13 and joined thereto. Above the inlet hopper 11, metering devices 14 are provided for the metered addition for instance of plastic pellets or powder to the inlet hopper 11. At the end of the casing section 10, which is the downstream end in the working direction 2, provision is made for a discharge opening 15 for the discharge of the material treated in the extruder 1.

The casing 5 has two partially intersecting casing bores 16, 17 which are parallel to each other. Two shafts 22, 23 (only diagrammatically outlined) are provided in the casing bores 16, 17 and are drivable to rotate in the same direction of rotation 18, 19 about an axis of rotation 20, 21 and are joined to the power take-off side of the gear 4. Various treating elements are provided non-rotatably on the shafts 22, 23, such as intermeshing screws 24 and kneading disks 25, 26, which are selected in dependence on their function and disposed successively in the working direction 2.

Figure 2:
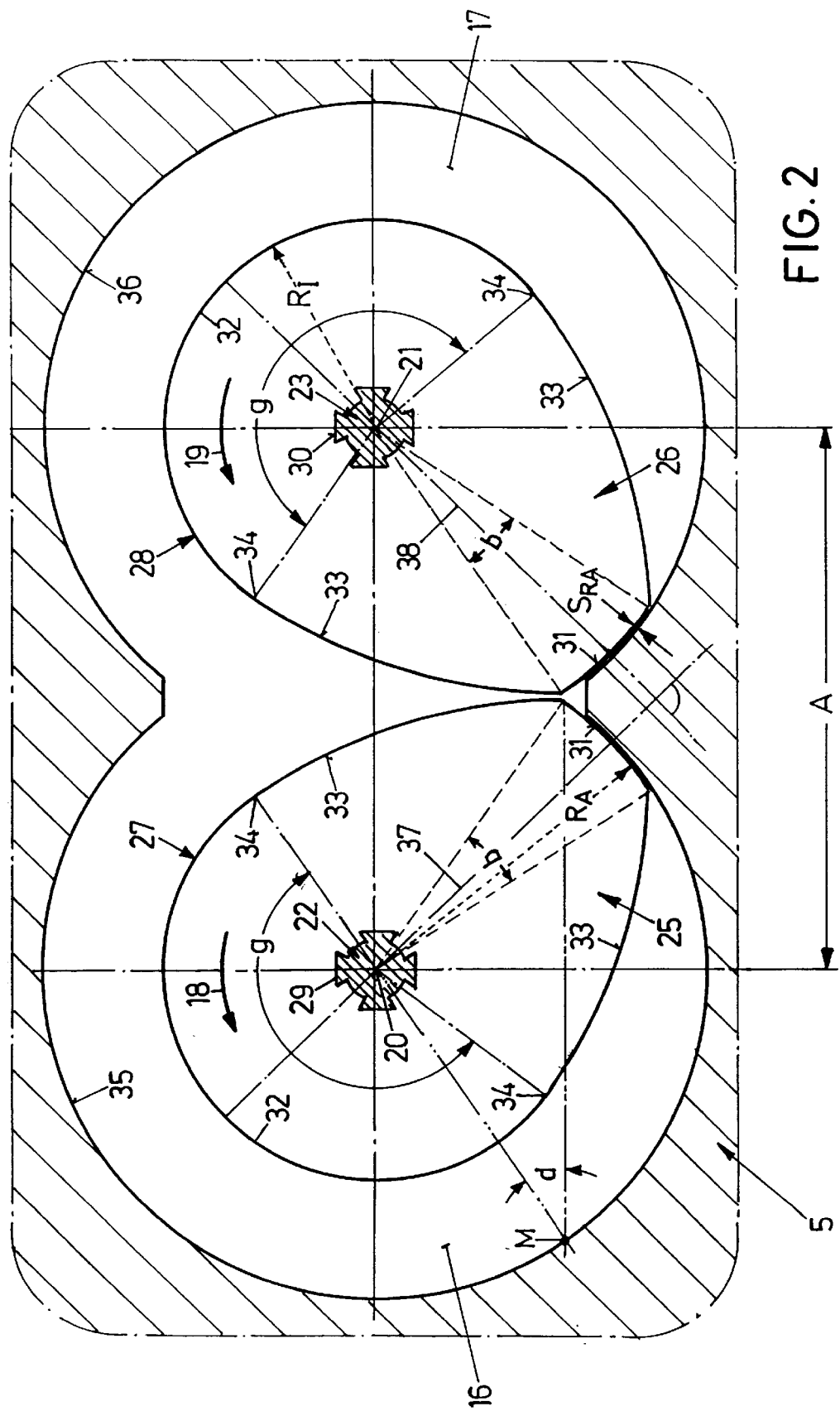
FIG. 2 is a cross-section through the extruder on the line II—II of FIG. 1 with the illustration of two kneading disks according to the invention.

The following is a detailed description of the kneading disks 25, 26 with reference to FIG. 2. The kneading disks 25, 26 have surface lines 27, 28, which are parallel to the axes of rotation 20 and 21, as well as centric recesses 29 and 30 for the accommodation of the shafts 22 and 23. In a cross-sectional illustration vertical to the axes of rotation 20 and 21, the kneading disks 25, 26 have a crest 31, a bottom 32, and two flanks 33 which connect them. The crest 31 is formed as a segment of a circle about the respective axis of rotation 20 and 21, having a crest angle b and a radius $R_A$. The bottom 32 is formed as a segment of a circle about the respective axis of rotation 20 and 21, having a bottom angle g and a radius $R_I$, $R_A > R_I$ applying. The flanks 33 are formed as a segment of a circle, having an angle at center d about central points M. A central point M is seen in FIG. 2 for the right flank 33 of the kneading disk 25. The central point M results from the prolongation of an end 34 of the bottom 32 beyond the respective axis of rotation 20 and 21 by a length $R_A + R_I$. Consequently, the radii of the circle segments which constitute the flanks 33 are $R_A + R_I$. Thus, the kneading disks 25, 26 have a substantially ovular cross-section. An angle $b_E$ can be defined, using the variables so far introduced: $b_E = 180° - 2 * \arccos \{0.5 * [1 + 1/(R_A/R_I)]\}$. The axes of rotation 20, 21 have a distance A from each other which slightly exceeds $R_A + R_I$.

The casing bores 16, 17 have a diameter of $2 * R_A + 2 * S_{RA}$, $S_{RA}$ being the radial play between the crest 31 and the casing wall 35. The casing bores 16, 17 are disposed at a distance $A = R_A + R_I + S_A$, $S_A$ being the center to center play. Consequently, the casing bores 16, 17 overlap and are of figure eight type configuration in cross-section.

In addition to the play by which the kneading disks 25, 26 strip each other, the radial play $S_{RA}$ is important too. For many objects of process implementation, the radial play $S_{RA}$ must be adapted to the working process, which can be attained in various ways. Given a constant profile of the kneading disks 25, 26, the diameter of the casing bores 16, 17 is correspondingly increased. By alternative, the radius $R_A$ of the kneading disks 25, 26 can be reduced while the diameter of the casing bores 16, 17 remains constant. In yet another alternative, the radius $R_A$ can be reduced and the radius $R_I$ can be correspondingly increased, while the diameter of the casing bores 16, 17 remains the same. The result is a smaller ratio $R_A/R_I$. This smaller ratio of radii produces a smaller angle, the so-called wedge angle, between the flank 33 of the kneading disks 25, 26 and the wall 35, improved extensional flow being able to develop, having favorable homogenization effects. By alternative, a smaller radial play $S_{RA}$ with a smaller wedge angle between the flank 33 and the wall 35 can be attained when the kneading disks 25, 26 are disposed eccentrically relative to the axes of rotation 20, 21 seen in FIG. 2. The kneading disks 25, 26 can be disposed eccentrically also in the alternative according to which the radius $R_A$ is correspondingly reduced while the diameter of the casing bores remains constant.

As regards the crest angle b, $0° \leq b \leq 45°$ applies, in particular $3° \leq b \leq 22°$, and by special preference $3° \leq b \leq 10°$. The kneading disks 25, 26 are formed by mirror symmetry to a central longitudinal plane 37 and 38 through the axes of rotation 20 and 21 and through the center of the respective crests 31. The kneading disks 25, 26 are single-flight, i.e. the space around a kneading disk 25 and 26 within a casing bore 16 and 17 is only once divided by the crest 31.

Two kneading disks 25, 26 which are disposed on the shafts 22 and 23 in the same cross-section are designated as a pair of kneading disks 39. It is also possible, in the same cross-section of a kneading disk 25 of a certain thickness, to dispose two kneading disks 26 of half the thickness on the other shaft. Likewise it is possible, in the same cross-section of a kneading disk 25 of a certain thickness, to dispose any number of kneading disks 26 on the other shaft, the sum of the thicknesses of all the kneading disks 26 not being allowed to exceed the thickness of the kneading disk 25, and the addendum modification angle z having to be within the admissible limits.

Figure 3:
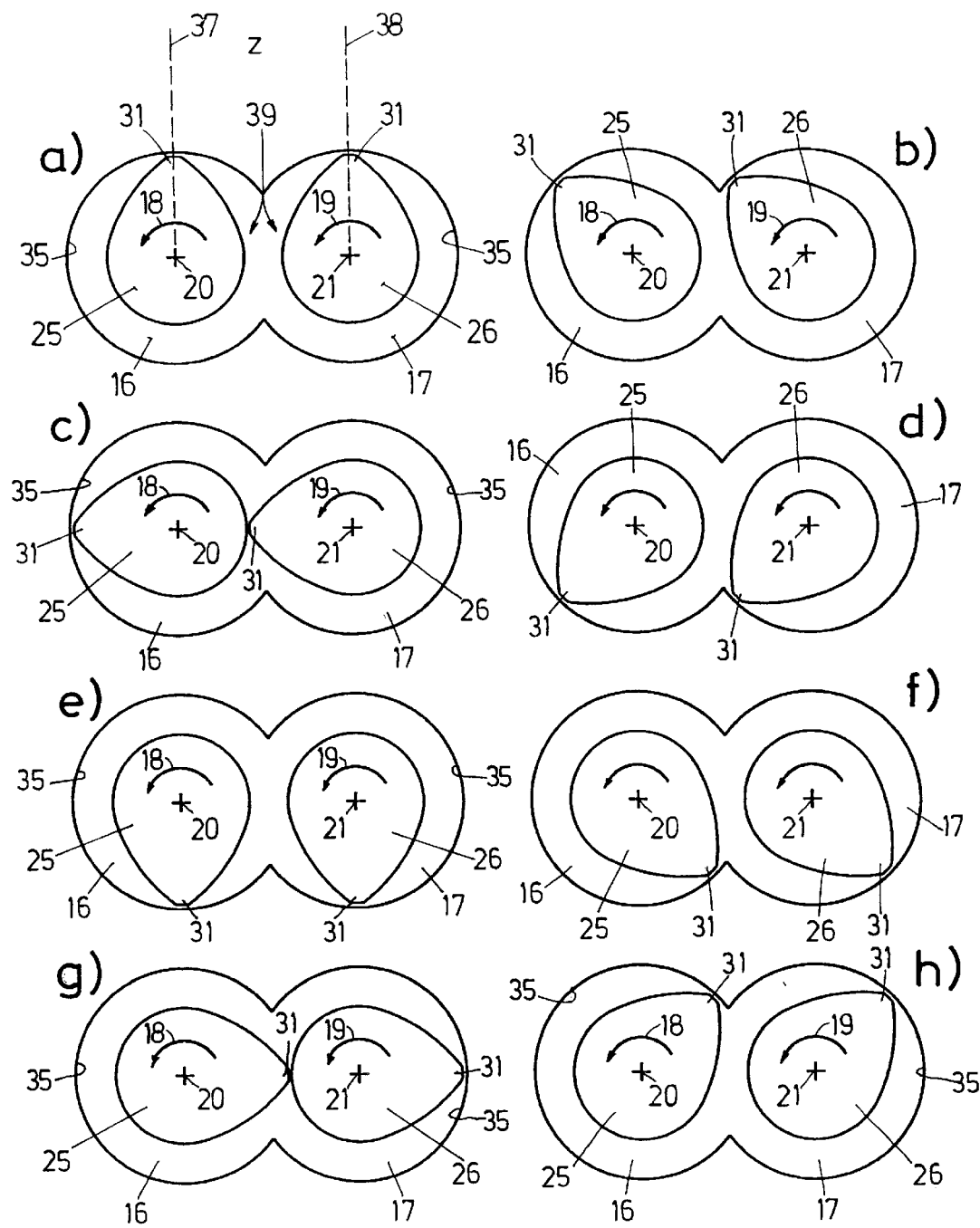
FIG. 3 a) to h) are cross-sections according to FIG. 2 at varying moments in a chronological sequence with an addendum modification angle z=0°.
Figure 4:
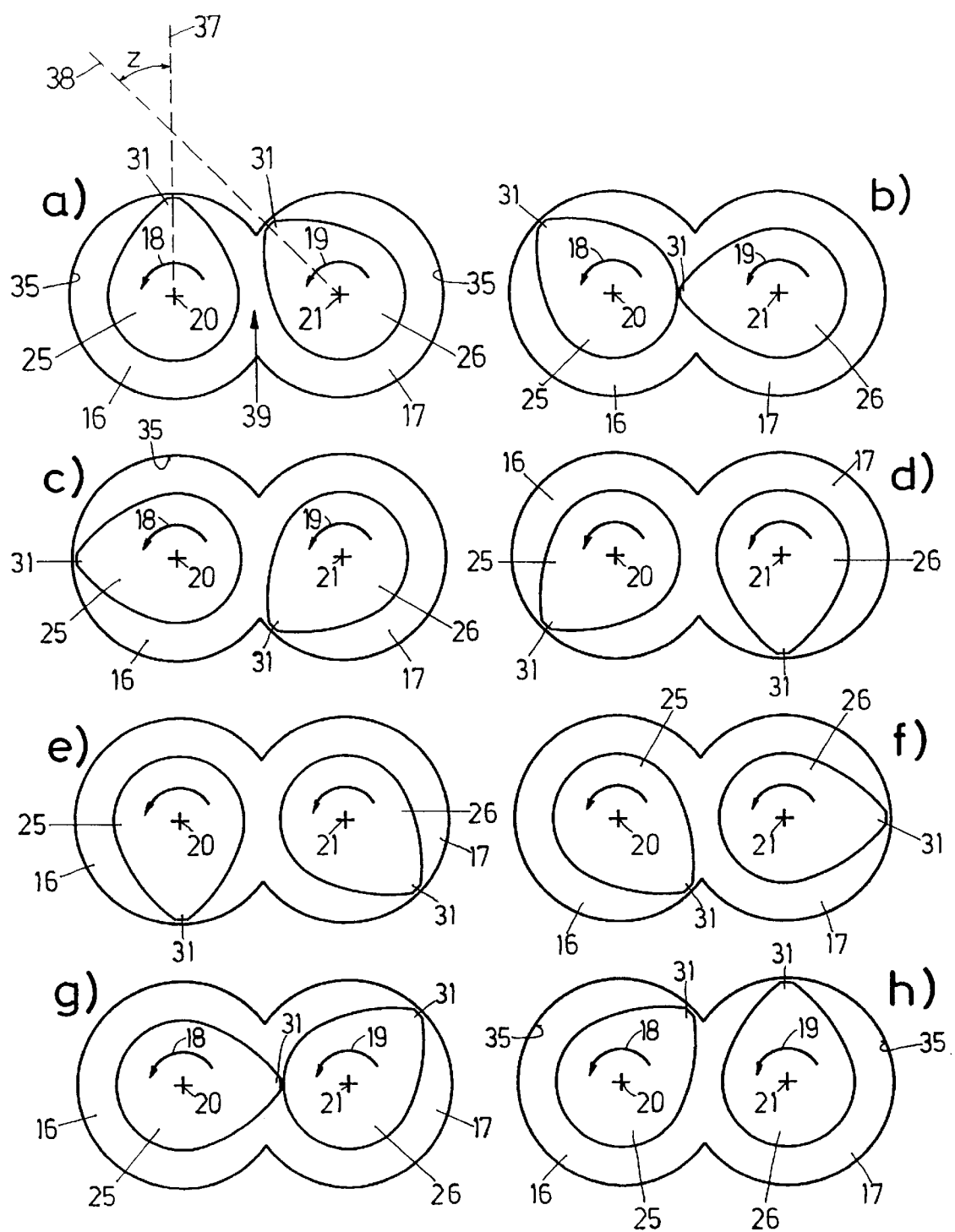
FIG. 4 a) to h) are illustrations as in FIG. 3 with an addendum modification angle z=45°.
Figure 5:
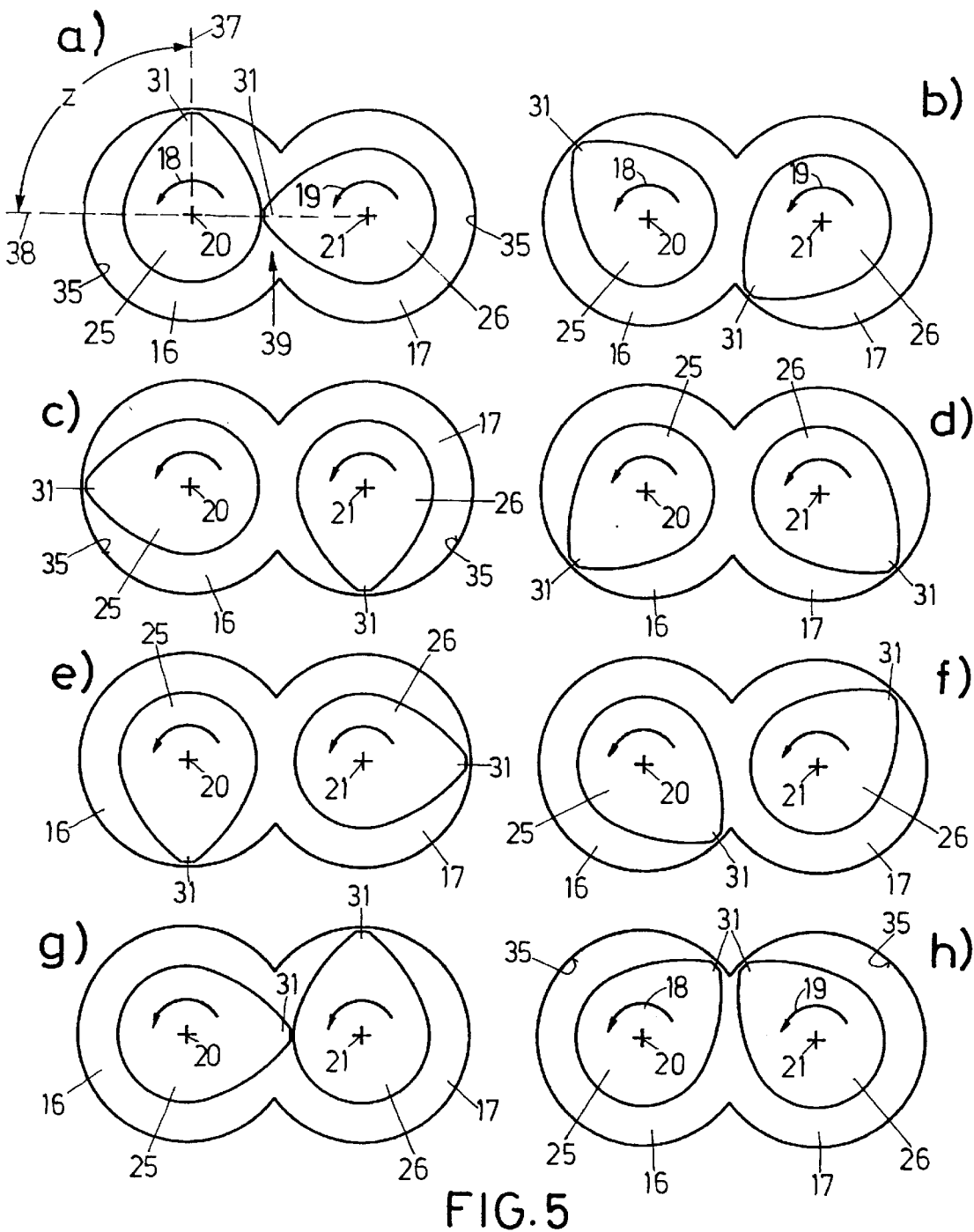
FIG. 5 a) to h) are illustrations as in FIG. 3 with an addendum modification angle z=90°.

FIGS. 3, 4 and 5 show varying positions of a pair of kneading disks 39 during continuous rotation about the axes of rotation 20, 21 as illustrations a), b), ..., h). The addendum modification angle enclosed by the central longitudinal planes 37, 38 is denoted by z. It is $z=0°$ in the case of FIG. 3, since the central longitudinal planes 37, 38 extend parallel to each other; it is $z=45°$ in FIG. 4 and $z=90°$ in FIG. 5. The addendum modification angle z may be freely selected within certain ranges. The only requirement is that the kneading disks 25, 26 of a pair 39 of kneading disks do not block each other upon rotation. $-(b_E - b) \leq z \leq +(b_E - b)$ applies. The individual illustrations of FIGS. 3, 4 and 5 show that the crest 31 always moves along the entire wall 35, thereby cleaning it. The illustrations a), b), ..., h) further show that the kneading disks 25, 26 of a pair of kneading disks 39 wipe each other along part of their surface line 27, 28. A wiping situation is seen for instance in FIGS. 3c) and 3g). Situations where no wiping takes place are shown for instances in FIGS. 3a), 3b), 3d), 3e), ef), 3h).

Figure 6:
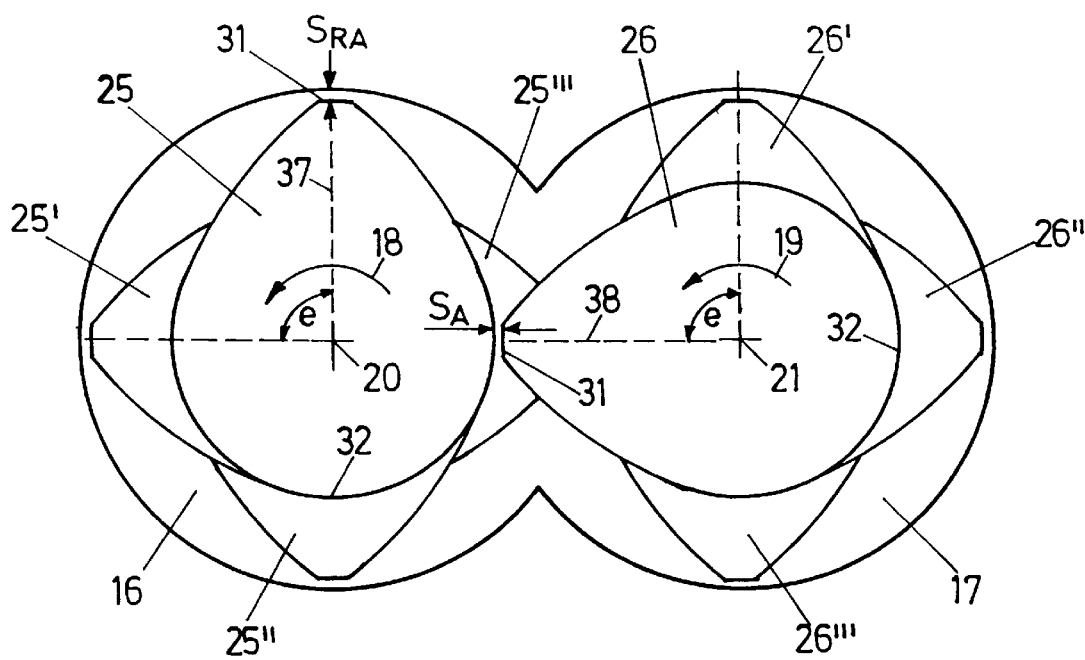
FIG. 6 is an illustration as in FIG. 2 with kneading disks arranged to be offset successively.

Several kneading disks 25 and 26 are disposed one after the other in the working direction 2 on the shafts 22, 23. The angle enclosed by the central longitudinal planes 27, 38 of two kneading disks 25 and 26 which succeed each other on one and the same shaft 22 and 23 is designated as the offset angle e. In the case of an angle $3=180°$, the so-called neutral offset angle, no overall conveyance in or against the working direction 2 of the material worked in the extruder is performed by the successive kneading disks 25 and 26. Active conveyance, weak or increased de-accumulation can be implemented by the selection of the offset angle e. If kneading disks 25 and 26 which succeed one another in the working direction 2 are offset by an offset angle of $0° > |e| > 180°$ counter to the direction of rotation 18 and 19, conveyance of the material treated in the extruder 1 takes place in the working direction 2. Small offset angles e have a higher conveying effect than great offset angles e. Given an offset angle of $0° > |e| > 180°$ in the direction of rotation 18 and 19, conveyance takes place against the working direction 2. FIG. 6 illustrates four kneading disks 25, 25', 25'', 25''' and 26, 26', 26'', 26''' disposed one after the other in the working direction 2. The kneading disks 25, 25', 25'', 25''' which rotate about the axis of rotation 20 are offset relative to each other by an offset angle $e=90°$ in the direction of rotation 18, which causes conveyance against the working direction 2. The kneading disks 26, 26', 26'', 26''' which rotate about the axis of rotation 21 are offset relative to each other by an offset angle $e=90°$ counter to the direction of rotation 19, which causes conveyance in the working direction 2. Such an arrangement of kneading disks is called a melt return stage 40, because the treated material circulates due to forward and backward conveyance. Of course, the offset angles e must be selected such that the kneading disks 25, 26 do not block each other upon rotation about the axes of rotation 20 and 21. The interrelationship illustrated in the table below applies to the possible offset angles e, the kneading disks 25, 25', 25'', 25''' of the shaft 22 being regularly offset in the direction of rotation 18 and those of the other shaft 23 against the direction of rotation 19.

| offset angle e | possible within a radii ratio $R_A/R_1$ |
|---|---|
| 90° | 2,4142 |
| 60° | 1,3660 |
| 45° | 1,1795 |
| 36° | 1,1085 |

Concluding it can be said that the kneading disks 25, 26 of both shafts 22, 23 can be disposed such that both kneading disks convey in the same direction or that the kneading disks of one shaft convey in the downstream direction and the kneading disks of the other shaft in the upstream direction. In this way, the melt is returned on one shaft in the upstream direction and the lengthwise mixing effect is increased considerably. An alternating way of installation is feasible too, according to which kneading disks of varying offset angles are disposed alternately one after the other.

Figure 7:
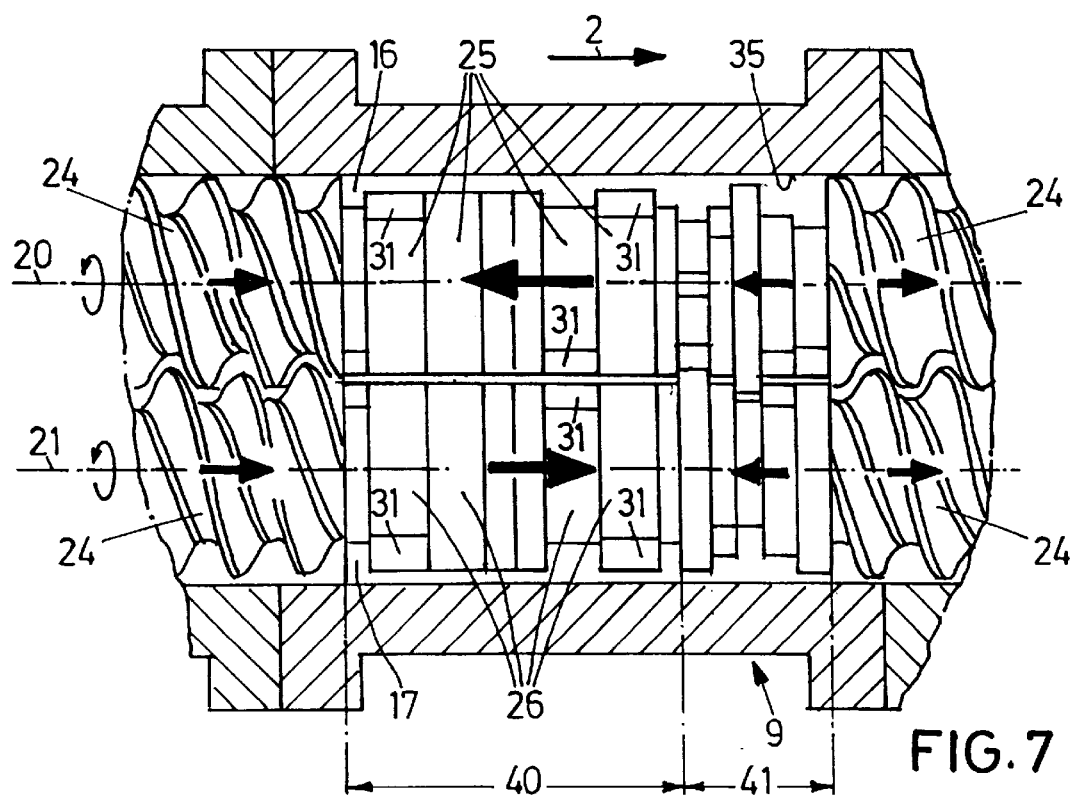
FIG. 7 is a partial longitudinal section through the extruder on the line VII—VII of FIG. 1.

As seen in FIG. 7, screws 24 as well as kneading disks 25, 26 can be disposed successively one after the other. A melt return stage 40 is disposed downstream of closely meshing screws 24 and is followed by a de-accumulation stage 41 of the known type which influences the accumulation length upstream towards, i.e. counter to, the working direction 2. The de-accumulation stage 41 is followed by closely meshing screws 24 for conveyance in the working direction 2.

What is claimed is:

1. A twin screw extruder (1) comprising a casing (5) with a working direction (2);

two partially intersecting casing bores (16, 17) disposed in the casing (5), which are parallel to each other;

two shafts (22, 23), which comprise each an axis of rotation (20, 21), which are disposed in the casing bores (16, 17) and which are drivable to rotate in a same direction of rotation (18, 19) about the respective axis of rotation (20, 21), the axes of rotation (20, 21) having a distance A from each other; and single-flight kneading disks (25, 26), which are fixed on the shafts (22, 23) and have surface lines (27, 28) extending parallel to the respective axis of rotation (20, 21), the kneading disks (25, 26), in a cross-section perpendicular to the axis of rotation (20, 21), comprising a crest (31), which is formed as a segment of a circle about the respective axis of rotation (20, 21) and which has a crest angle b and a radius $R_A$;

a bottom (32), which is formed as a segment of a circle about the respective axis of rotation (20, 21) and has a bottom angle g and a radius $R_I$;

two flanks (33), and which join the crest (31) and the bottom (32);

$R_A > R_I$ and $A \approx R_A + R_I$ applying;

wherein $0° \leq b \leq 45°$ applies to the crest angle b.

2. A twin screw extruder (1) according to the claim 1, wherein $3° \leq b \leq 20°$ applies to the crest angle b.

3. A twin screw extruder (1) according to claim 1, wherein $3° \leq b \leq 10°$ applies to the crest angle b.

4. A twin screw extruder (1) according to claim 1, wherein each kneading disk (25, 26) is formed in mirror symmetry to a central longitudinal plane (37, 38), which extends through the respective axis of rotation (20, 21) and through the center of the crest (31).

5. A twin screw extruder (1) according to claim 4, wherein two of said kneading disks (25, 26), which are disposed on said two shafts (22, 23) in the same cross section, constitute a pair of kneading disks (39), the central longitudinal planes (37, 38) of the kneading disks (25, 26) of a pair of kneading disks (39) enclosing an addendum modification angle z so that the kneading disks (25, 26) do not block each other upon rotation in the same direction about the axes of rotation (20, 21).

6. A twin screw extruder (1) according to claim 5, wherein $(b_E-b) \leq z \leq +(b_E-b)$ applies to the addendum modification angle z, the angle $b_E$ being defined as $b_E = 180° - 2 * \arccos\{0,5 * [1+1/(R_A/R_I)]\}$.

7. A twin screw extruder (1) according to claim 4, wherein the central longitudinal planes (37, 38) of two of said kneading disks (25, 26), which directly adjoin in the working direction (2) on one of said two shafts (22, 23), enclose an offset angle e.

8. A twin screw extruder (1) according to claim 7, wherein the kneading disks (25, 26) of at least one of said two shafts (22, 23) are offset in the working direction (2) by said offset angle e counter to the direction of rotation (18, 19) for conveyance in the working direction (2), $0° > |e| > 180°$ applying.

9. A twin screw extruder (1) according to claim 7, wherein the kneading disks (25, 26) of at least one of said shafts (22, 23) are offset in the working direction (2) by said offset angle e in the direction of rotation (18, 19) for conveyance against the working direction (2), $0° > |e| > 180°$ applying.

10. A twin screw extruder (1) according to claim 7, wherein the kneading disks (25, 25', 25'', 25''') of one of said two shafts (22) are offset in the working direction (2) against the direction of rotation (18) by said offset angle e with in $|e| > 180°$ applying and wherein the kneading disks (26, 26', 26'', 26'41 ) of the other of said shafts (23) are offset in the working direction (2) in the direction or rotation (19) by said offset angle e, with $|e| > 180°$ applying.

11. A twin screw extruder (1) according to claim 7, wherein the kneading disks (25, 26) of the two shafts (22, 23) are disposed in the same direction, however at varying values for said offset angle e.

12. A twin screw extruder (1) according to claim 1, wherein the kneading disks (25, 26) have a radial play $S_{RA}$ in the casing bores (16, 17).

13. A twin screw extruder (1) according to claim 12, wherein for the production of the radial play $S_{RA}$ in the casing bores (16, 17) is increased while the profile of the kneading disks (25, 26) remain constant.

14. A twin screw extruder (1) according to claim 12, wherein for the production of the radial play $S_{RA}$, the radius $R_A$ is made smaller while the diameters of the casing bores (16, 17) remain constant.

15. A twin screw extruder (1) according to claim 12, wherein for the production of the radial play $S_{RA}$, the radius $R_A$ is reduced and $R_I$ is increased, the ratio $R_A/R_I$ thus being smaller, while the diameters of the casing bores (16) remain constant.

16. A twin screw extruder (1) according to claim 12, wherein the kneading disks (25, 26) are mounted eccentrically with respect to at least one of said two shafts (22, 23).

17. A twin screw extruder (1) according to claim 1, wherein the axes of rotation (20, 21) are formed to have a center to center play $S_A$, $A = R_A + R_I + S_A$ applying.

* * * * *